C. ALEXANDER & F. PENCE.
GEARING.
APPLICATION FILED SEPT. 18, 1911.

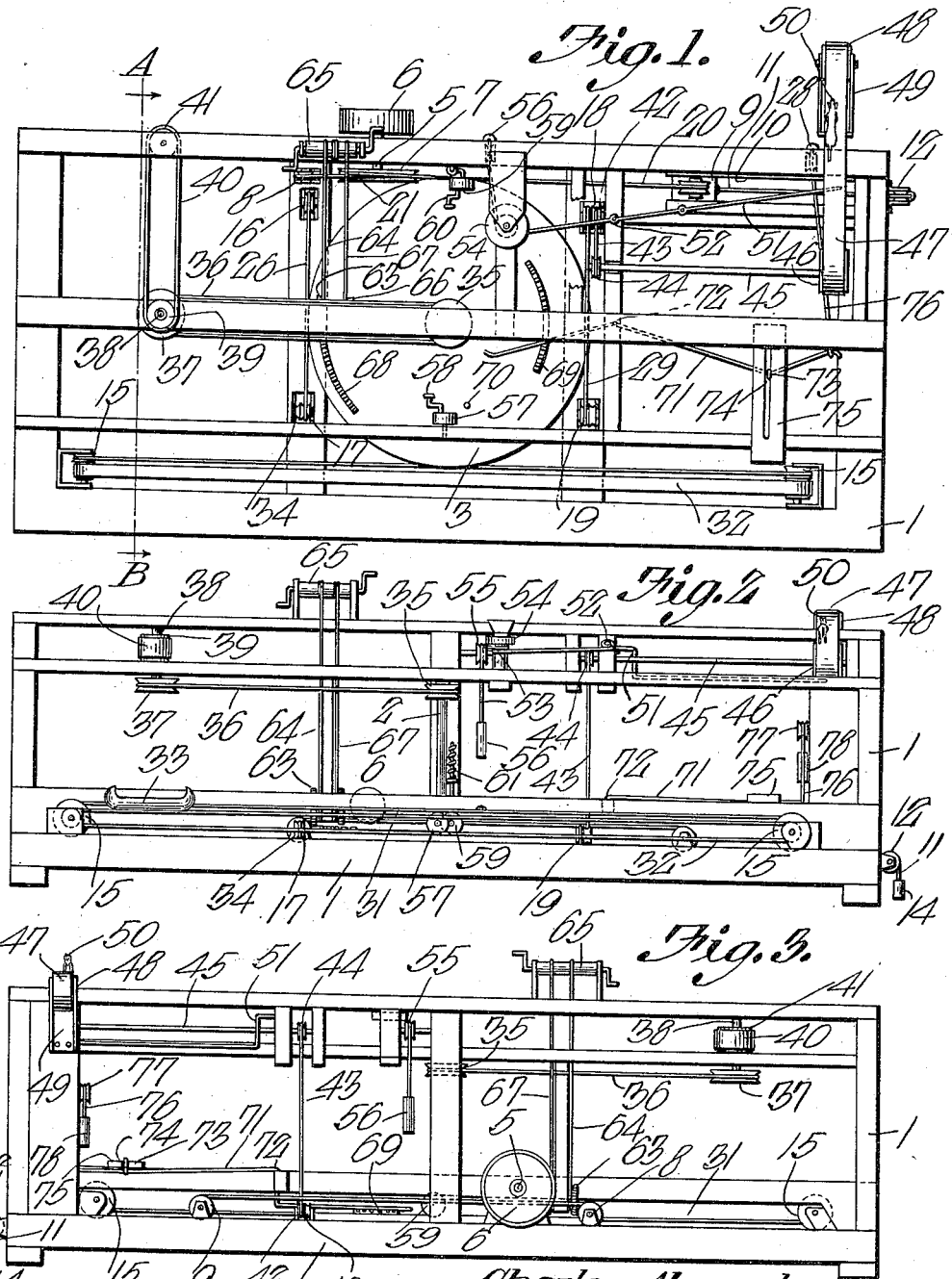

1,045,112.

Patented Nov. 26, 1912.

2 SHEETS—SHEET 2.

Witnesses

Charles Alexander
and Frank Pence Inventors by C. A. Snow & Co.
Attorneys

UNITED STATES PATENT OFFICE.

CHARLES ALEXANDER AND FRANK PENCE, OF GRANITE, OREGON.

GEARING.

1,045,112.  Specification of Letters Patent.  Patented Nov. 26, 1912.

Application filed September 18, 1911. Serial No. 650,051.

*To all whom it may concern:*

Be it known that we, CHARLES ALEXANDER and FRANK PENCE, citizens of the United States, residing at Granite, in the county of Grant, State of Oregon, have invented a new and useful Gearing, of which the following is a specification.

It may be stated at the outset, that the device forming the subject matter of this patent, is not of wide or general application in the field of mechanics. It is intended for a single purpose, to-wit, to serve as an intermediate mechanism between a prime mover, such as an electric motor, and a series of movable, mechanical figures, representing upon a small scale, the activities of a community.

Specifically, the device is adapted to be employed for the operation of images, machines, and the like such as may be seen about a western mining camp, these movable elements being hunters in pursuit of game, drilling machines, passing vehicles and the like. These figures are shown and described only in so far as they enter into the operation of the mechanical movement proper. When they are mere driven elements, their places of operative attachment will be specified, it being entirely feasible for a person having a full understanding of the driving mechanism, to connect the proper figure to be operated with the machine, at the place indicated.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 4:
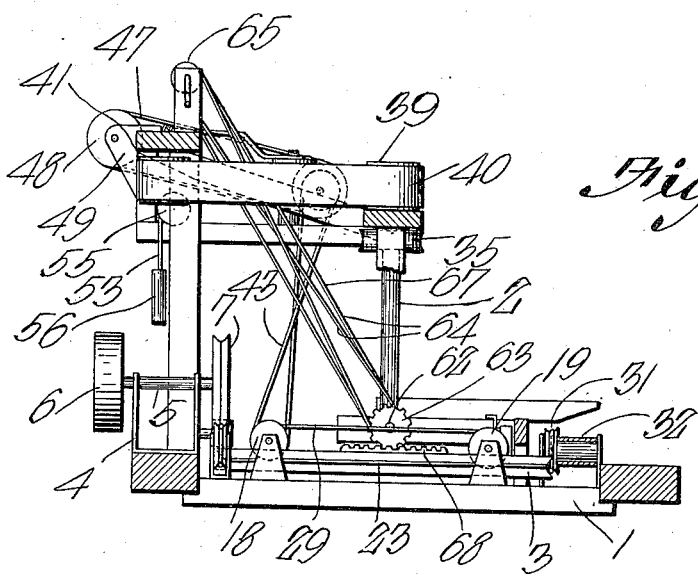

In the accompanying drawings,—Figure 1 shows the invention in top plan; Fig. 2 is a front elevation; Fig. 3 is a rear elevation; Fig. 4 is a section on the line A—B of Fig. 1; and Fig. 5 is a diagrammatic perspective, illustrating the configuration of the main driving belt.

In carrying out the invention there is provided as a primary and fundamental element, a supporting frame, denoted generally by the numeral 1. Journaled for rotation in the frame 1, intermediate the front and rear thereof, and about mid-way between the ends of the frame 1, is an upright main shaft, denoted generally by the numeral 2. Secured to the main shaft 2, and located adjacent the bottom of the frame 1, is a horizontally disposed main-wheel 3. Carried by the frame 1, adjacent the rear of the frame and at the bottom thereof, is as seen most clearly in Fig. 4, a bearing 4, in which is journaled for rotation, a horizontally disposed drive shaft 5, extended transversely of the frame 1, from the front of the frame toward the rear thereof. The rear end of the main drive shaft 5 protrudes slightly beyond the remaining portions of the frame 1, and to the protruding end of the drive shaft 5 is secured a vertical pulley 6, adapted to be connected through the instrumentality of a belt, with any suitable prime mover such, for instance, as an electric motor. Secured to the inner end of the drive shaft 5 is another pulley 7. Carried by the frame 1 adjacent the rear of the frame, are rear pulleys 8 and 9, the pulleys 8 and 9 being vertically disposed, and being positioned to extend lengthwise of the frame. That pulley which is denoted specifically by the numeral 9 is slidably mounted in guides 10, located adjacent one corner of the frame. A flexible element 11 is secured to the bearing in which the pulley 9 is mounted, the flexible element being trained over a sheave 12, located upon the frame 1, at one end thereof. Secured to the free end of the element 11, is a weight 14. It will be seen that the slidably mounted pulley 9, together with the flexible element 11 and the weight 14, constitute a tightener, whereby a belt which is carried by the pulleys 8 and 9, may be maintained stretched.

The invention further includes a pair of front pulleys 15, located, as their name indicates, adjacent the front of the frame, and in the lower portion thereof. The front pulleys 15 are vertically disposed, and extend longitudinally of the frame 1. A pair of side pulleys 16 and 17 are provided, these pulleys being alined substantially with the pulley 8, the pulleys 16 and 17 extending transversely of the frame, while the pulley 8 extends longitudinally of the frame. The invention further includes a pair of side pulleys 18 and 19, extended transversely of the frame and journaled for rotation thereon. The main wheel 3, as will be clearly seen from an inspection of Fig. 1, lies between the pulleys 16 and 17 upon the one hand and the pulleys 18 and 19 upon the other hand.

Figure 5:
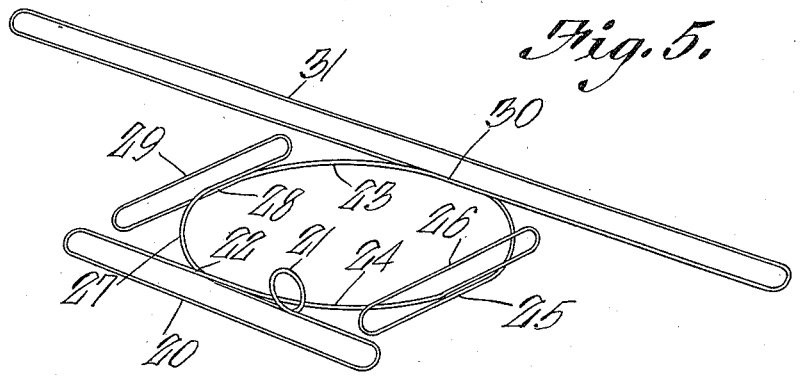

There is provided, for the actuation of the several pulleys above referred to, a main driving belt, seen in clearest outline in Fig. 5. This main driving belt is, in the first instance, trained about the rear pulleys 8 and 9, as indicated at 20. The upper run of the portion 20 of the belt is fashioned into a loop 21, the loop 21 engaging the pulley 7 which is carried by the inner end of the drive shaft 5. To one side of the loop 21, the upper run of the portion 20 of the driving belt is crossed, as shown at 22, and is carried around the periphery of the main wheel 3, as denoted by the numeral 23 in Fig. 4. One side or segment of the portion 23 of the main driving belt, denoted specifically by the numeral 24, is crossed upon itself as shown at 25, to form a loop 26, which loop 26 is trained around the side pulleys 16 and 17. The other portion or segment of the part 23 of the driving belt, denoted specifically by the numeral 27, is crossed upon itself as shown at 28, to form a loop 29, the loop 29 being engaged with the side pulleys 18 and 19. In its forward portion, the part 23 of the belt which surrounds the main wheel 3, is crossed upon itself, as shown at 30, to form a relatively long loop 31, the loop 31 being engaged with the front pulleys 15. At this point it may be stated that the pulleys 15 carry, and serve to actuate, a horizontally moving belt 32, located at the front of the structure. This belt 32 may be taken to represent the surface of a stream of water or the like. When the belt 32 is employed to indicate a flowing stream of water, the belt will carry any desired number of figures, representing boats, as denoted by the numeral 33 in Fig. 2.

The pulley 17 is provided with an auxiliary tread, denoted by the numeral 34. This auxiliary tread 34, is adapted to operate a belt (not shown) which belt, in its turn, may be employed to operate a mill, the forge of a smith or the like.

The vertical, main drive shaft 5 carries, adjacent its upper end, a horizontal pulley 35, about which is trained a belt 36, passed over a sheave 37, carried by a vertical, frame-supported shaft 38, having at its upper end, a horizontally disposed pulley 39, about which is trained a belt 40, extended transversely of the frame, the rear portion of the belt 40 being supported by a horizontally disposed pulley 41 journaled for rotation in the upper portion of the frame 1, adjacent the rear thereof. The belt 40 is adapted to be employed for the operation of a mine car, or similar structure.

The side pulley 18 is equipped with an auxiliary tread 42, about which is trained a belt 43, the belt being crossed and extended upwardly, over a sheave 44, carried by a horizontal, frame-supported shaft 45, extended longitudinally of the supporting structure. At its outer end, the shaft 45 carries a vertical pulley 46, about which is trained a belt 47, the belt 47 extending transversely of the frame 1, and being horizontally disposed. The rear portion of the belt 47 is trained about a pulley 48, carried by a hanger 49, located upon the rear portion of the frame 1, the hanger 49 being of sufficient size to accommodate any suitable means for moving the pulley 48, whereby the belt 47 may be made taut. The belt 47 is provided with a series of projections 50, these projections 50 preferably taking the form of coyotes or other wild animals, it being obvious that when the belt 47 is operated, these animals 50 will move transversely of the frame, from the front of the frame toward the rear portion thereof.

When the belt 47 is in operation, the projections 50 are adapted to engage successively with the free, outer end of a horizontally moving lever 51, fulcrumed as shown at 52, intermediate its ends, upon any suitable portion of the frame 1. Secured to the inner end of the lever 51, is a flexible element 53, seen most clearly in Fig. 2, the flexible element 53 being trained about a vertical roller or drum 54, journaled for rotation in the frame 1, and located relatively near to the upper, rear portion of the frame. The free end of the flexible element 53, extending beyond the drum 54, is trained about a frame-supported sheave 55, and the free end of the flexible element 53 carries a weight 56. It may be stated at this point, that the lever 51 may be operatively connected with a figure (not shown), representing a hunter, the construction being such that the lever 51 will move with the belt 47, to move the hunter out of a cabin, when the animals 50 move across the landscape, with the belt 47. The projections 50, engaging one end of the lever 51, will tilt the lever in one direction, the weight 56 serving to restore the lever to its original position.

Supported upon the lower portion of the frame 1, adjacent the front of the frame, is, as seen most clearly in Fig. 1, a vertical friction wheel 57, adapted to bear against the upper face of the main wheel 3, the wheel 57 being provided with a crank portion 58, which crank portion may be employed for actuating a double-hand drill (not shown) or other like device common about a mining camp. Carried by the rear portion of the frame 1, is a wheel 59, adapted to bear frictionally upon the upper surface of the main wheel 3, the wheel 59 having a crank portion 60, which may be employed for actuating a single hand drill (not shown). It is obvious that the wheels 57 and 59 may be spring-pressed against the main wheel 3. A suitable mechanism for accomplishing this result, is shown conventionally, in connection with one of the wheels, in Fig. 2, this mechanism being denoted by the numeral 61.

Noting particularly Fig. 4, it will be seen that a horizontally disposed shaft 62 is journaled for rotation in any suitable portion of the frame 1, adjacent the lower portion of the frame. Secured to one end of this shaft 62 is a pinion 63, appearing in Figs. 4 and 2. The pinion 63 is provided with a sheave portion, about which is trained a cross belt 64, extended upwardly, toward the rear of the frame 1, the belt 64 being trained about a windlass 65, journaled for rotation upon the upper portion of the frame. The shaft 62 carries also, a pinion 66, about which is trained a belt 67, the belt 67 being carried upwardly and rearwardly, without being crossed, the belt last mentioned being trained about the windlass 65. Secured to the upper face of the main wheel 3, is a segmental rack 68, which is adapted to engage with the pinion 63. Another rack 69 is secured to the upper face of the main wheel 3, this rack 69 being adapted to engage with the pinion 66, the racks 68 and 69 being spaced apart, so that but one of them at a time, will be interengaged with its corresponding pinion. The windlass 65 is adapted to be employed for illustrating the raising and lowering of mined material out of the earth, and it is obvious that the racks 68 and 69 will engage, successively, with the pinions 63 and 66, the windlass 65 being rotated, thus, first in one direction and then in another, so as to automatically raise and lower the material.

Upstanding from the main wheel 3, is a pin 70, seen to best advantage in Fig. 1, the pin 70 being adapted to engage with the free, inner end of a lever 71, extended longitudinally of the frame, and fulcrumed intermediate its ends, as shown at 72 in Fig. 2, upon any suitable portion of the frame. The outer end of the lever 71 carries an upstanding finger 73, adapted to move in a slot 74, formed in an arm 75, extended transversely of the frame 1, and supported thereby, adjacent one end of the frame. Attached to the free, outer end of the lever 71, and extended transversely of the frame, is a flexible element 76, trained about a vertically disposed, frame-supported pulley 77, the pulley 77 carrying at its free end, a weight 78. It will be seen that when the main wheel 3 is rotated, the pin 70 will strike the inner end of the lever 71 tilting the lever, and causing the finger 73 to move transversely of the frame, in the slot 74 of the arm 75. As soon as the pin 70 is out of engagement with the inner end of the lever 71, the lever 71 will be restored to its original position, through the action of the weight 78. The finger 74 is adapted to serve as a place of attachment for a figure (not shown) representing a miner trundling a wheelbarrow, the construction being such that this figure will move in and out of a tunnel, or have any other appropriate movement with respect to the landscape.

The drives are as follows: When the pulley 6 and the drive shaft 5 are actuated, the pulley 7 will be rotated, putting the main driving belt into operation, through the engagement between the portion 21 of the main driving belt and the pulley 7. The rear pulleys 8 and 9 will be rotated, and the belt tightener, comprising the elements 11 and 14, will serve to take the slack out of the belt. That portion 23 of the main driving belt which encircles the main wheel 3, will rotate the main wheel. The looped portion 29 of the main driving belt will actuate the pulleys 19 and 18, and the looped portion 26 of the main driving belt will actuate the pulleys 16 and 17. The looped portion 31 of the main driving belt, will rotate the front pulleys 15, and through the instrumentality of these pulleys, the belt 32 will be moved, causing the boats 33 to move longitudinally of the main frame 1. When the pulley 18 is thus rotated, the belt 43 will actuate the shaft 45, the shaft 45 actuating the belt 47, and causing the objects 50 thereon, to have a like movement. The projections 50 upon the belt 47, engaging the free outer end of the lever 51, will tilt the lever 51, the function of the lever 51 having been stated hereinbefore. The weight 56 which is at the end of the flexible element 53, will return the lever 51 to its normal position. When the main wheel 3 is rotated, the racks 68 and 69 will engage successively with the pinions 63 and 66, the pinions 63 and 66 actuating their respective belts 64 and 67, the belts 64 and 67 coöperating to reverse the rotation of the windlass 65. When the main wheel 3 is rotated, the pin 70 will engage with the free, inner end of the lever 71, causing the lever to tilt, the lever carrying in its movement, the finger 73, the same moving in the slot 74 of the arm 75, the finger 73, being slidably mounted upon the lever 71, so as to have proper movement in the slot 74. When the main wheel 3 is rotated, the vertical shaft 2 will be rotated, actuating the belt 36, the belt 36 rotating the shaft 38, the shaft 38 actuating the belt 40.

Having thus described the invention, what is claimed is:—

1. Actuating mechanism for a display device, comprising a frame; a vertically disposed main shaft journaled for rotation in the frame; a main wheel secured to the main shaft; a second shaft journaled for rotation in the frame; pulleys upon the shafts; a belt trained about the pulleys; a pulley journaled for rotation upon the frame; a pulley secured to the second shaft; a belt connecting the last named pulleys and disposed at an angle to the belt whereby the shafts are connected; a driving belt trained about the main wheel; pulleys supported upon the frame at right angles to the plane of the main wheel, the driving belt being trained about the last named pulleys; a drive shaft journaled for rotation upon the frame; a pulley upon the drive shaft; one run of that portion of the driving belt which is trained about the last specified pair of pulleys, being trained about the pulley upon the drive shaft.

2. A device of the class described comprising a frame; a drive shaft journaled for rotation upon the frame, and provided with a pulley; a belt trained about the pulley and extended therefrom in opposite directions: frame-supported pulleys disposed substantially parallel to the first named pulley, and receiving the belt from said pulley; a main wheel journaled for rotation in the frame, at right angles to the plane of the pulleys, the belt being trained about the periphery of the main wheel; other pulleys located in spaced relation with respect to the first named set of pulleys, and disposed parallel thereto; an idle belt connecting the last named pulleys; the belt which is carried by the main wheel being extended therefrom about the last mentioned pulleys.

3. A device of the class described comprising a frame; a horizontally disposed main wheel journaled for rotation in the frame; spaced, segmental racks secured to the main wheel; frame-supported pinions adapted to mesh successively into the racks, the pinions having sheave portions; a windlass supported for rotation upon the frame; and belts connecting the windlass with the sheave portions of the pinions, one of said belts being crossed; a drive shaft; and a belt operatively connecting the main wheel with the drive shaft.

4. A device of the class described comprising a frame; a horizontally disposed main wheel journaled for rotation in the frame; a lever fulcrumed intermediate its ends upon the frame; a projection upon the main wheel, adapted to engage one end of the lever; an arm outstanding from the frame and provided with a slot; the other end of the lever being provided with a finger adapted to move in the slot; a drive shaft; and a belt operatively connecting the drive shaft with the main wheel.

5. A device of the class described comprising a frame; a horizontally disposed main wheel journaled for rotation in the frame; a drive shaft; a frame-supported pulley; a single belt operatively connected with the drive shaft and with the main wheel, and with said pulley; a shaft journaled for rotation in the frame, above the main wheel; a pulley upon said shaft; a belt connecting the last mentioned pulley with the pulley which is actuated by the main wheel; a pulley supported upon the frame adjacent the rear end thereof; a pulley upon the shaft; and a belt operatively connecting the last mentioned pulleys.

6. A device of the class described comprising a frame; a horizontally disposed main wheel journaled for rotation in the frame; a shaft journaled for rotation in the frame above the main wheel; a pulley upon the shaft; a pulley supported upon the frame; a belt connecting the pulleys; driving mechanism; a single belt operatively engaged with the driving mechanism, with the main wheel, and with the last specified pulley; a belt operable by the shaft, and provided with an outstanding projection; a lever fulcrumed intermediate its ends upon the shaft, and adapted to be engaged at one end by said projection; a flexible element secured to the other end of the lever; a roller about which the intermediate portion of the flexible element is trained; a pulley over which the flexible element is trained; and a weight carried by the flexible element, below the last mentioned pulley.

7. A device of the class described comprising a frame; a horizontally disposed main wheel journaled for rotation in the frame; spaced pulleys supported for rotation upon the frame, and disposed at right angles to the plane of the main wheel; a belt trained about said pulleys, and about the main wheel; one run of that portion of the belt which is trained about the pulleys being looped upon itself; a drive shaft upon the frame, having a pulley engaged by the looped portion of the belt; means for moving one of the pulleys which are rectangularly disposed with respect to the main wheel, thereby to effect a tightening of the belt; and driving mechanism operatively connected with the belt.

In testimony that we claim the foregoing as our own, we have hereto affixed our signatures in the presence of two witnesses.

CHARLES ALEXANDER.
FRANK PENCE.

Witnesses:
BENJ. G. AUSTIN,
ALLEN AMES.

Copies of this patent may be obtained for five cents each, by addressing the "Commissioner of Patents, Washington, D. C."